Dec. 29, 1964     J. E. CORRIGAN     3,163,063
WORKPIECE TRIMMING DEVICE
Filed Sept. 19, 1962     4 Sheets-Sheet 1

INVENTOR.
JOHN E. CORRIGAN
BY Cromwell, Greist and Warden
ATTORNEYS

Dec. 29, 1964  J. E. CORRIGAN  3,163,063
WORKPIECE TRIMMING DEVICE
Filed Sept. 19, 1962  4 Sheets-Sheet 2

INVENTOR.
JOHN E. CORRIGAN
BY Cromwell, Greist and Warden
ATTORNEYS

Dec. 29, 1964    J. E. CORRIGAN    3,163,063
WORKPIECE TRIMMING DEVICE
Filed Sept. 19, 1962    4 Sheets-Sheet 3
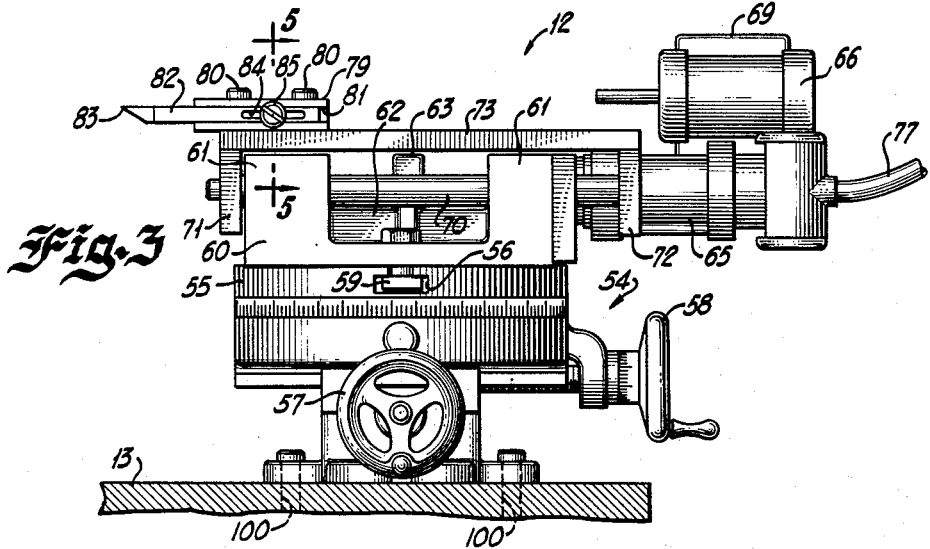
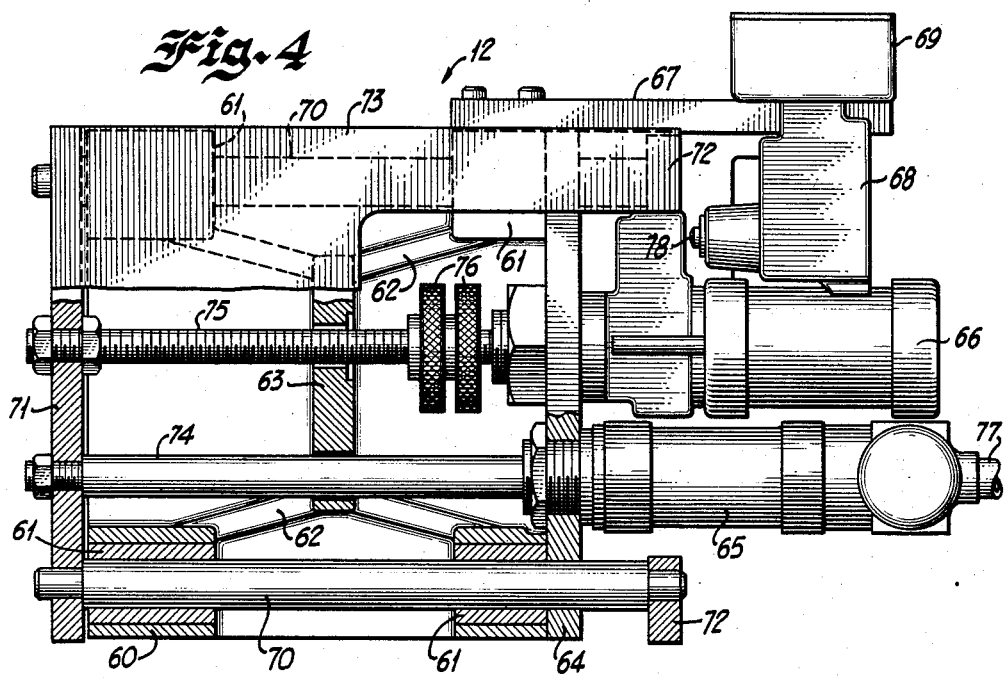
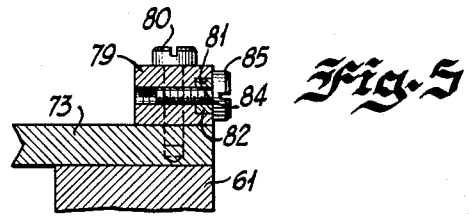
INVENTOR.
JOHN E. CORRIGAN
BY
Cromwell, Greist and Warden
ATTORNEYS

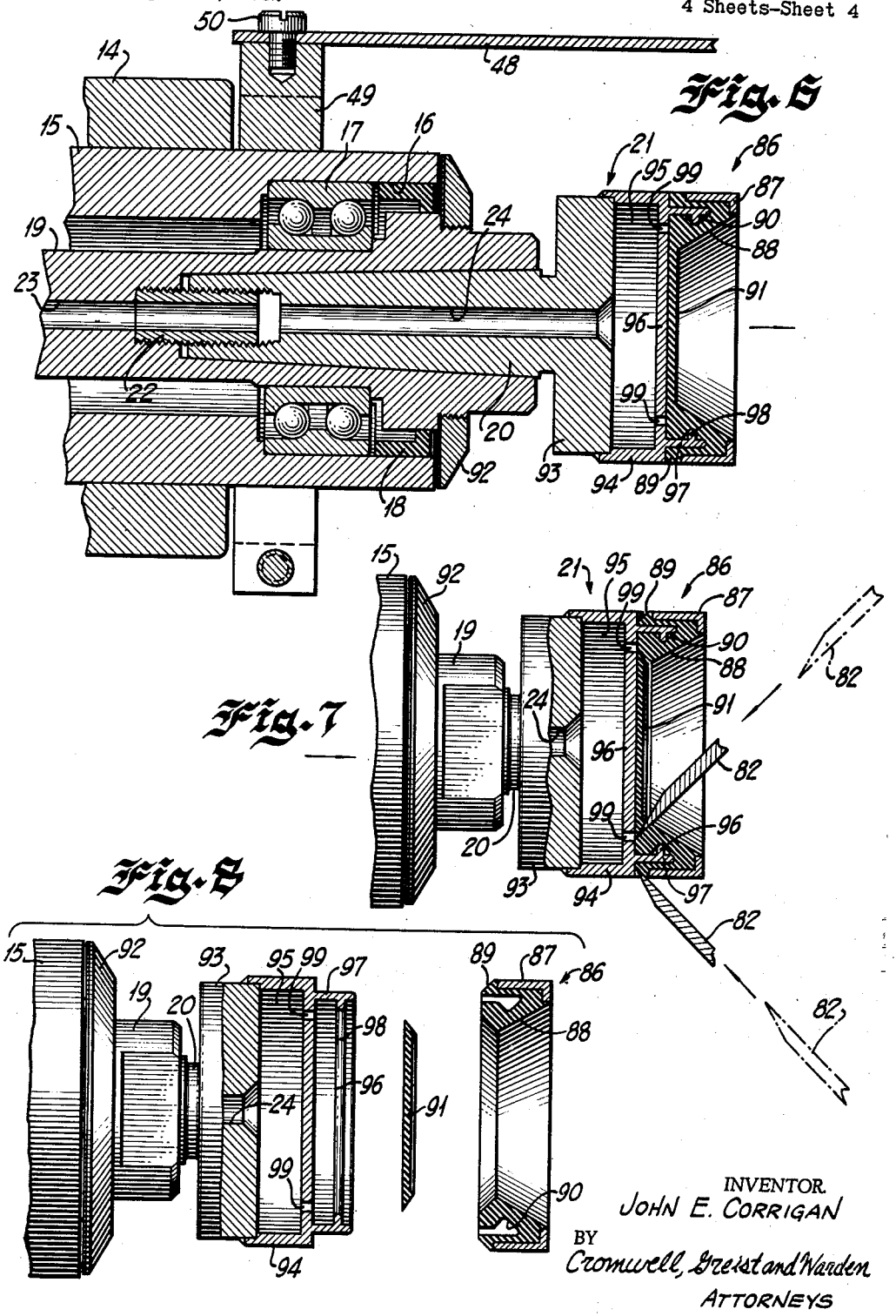

United States Patent Office 3,163,063
Patented Dec. 29, 1964

3,163,063
WORKPIECE TRIMMING DEVICE
John E. Corrigan, Evanston, Ill., assignor to Chicago Rawhide Mfg. Company, Chicago, Ill., a corporation of Illinois
Filed Sept. 19, 1962, Ser. No. 224,732
11 Claims. (Cl. 82—101)

The invention relates to a new and improved workpiece trimming device in the form of a unique assembly of cooperating workpiece holder and trimming knife devices which mutually converge in accordance with semi-automatic operation for controlled workpiece trimming in a new and improved manner. More specifically, the invention is directed to a new and improved assembly of rotating and reciprocating workpiece holder and at least one, but preferably a pair of, reciprocating workpiece trimming devices, the holder and trimming devices being arranged relative to one another for mutual converging cooperation providing for versatile and rather complicated workpiece trimming in an efficient and economical manner.

The devices and assembly of the present invention are adapted for use with a variety of workpieces, particularly rubber or plastic parts, but will be described in connection with use in the trimming of oil seals, for which use it is especially adapted. Historically, oil seal trimming devices have been designed in accordance with the operational concepts of hand operated lathes. The oil seal workpiece in its unfinished condition following molding thereof is mounted on a rotating spindle and a hand operated knife unit is advanced by the operator into trimming engagement with the rotating seal. The knife unit includes a knife carried by a movable linkage system including an operating handle or the like which is grasped by the operator. The entire movement required to bring about engagement between the knife and the rotating seal is realized through the hand operated linkage arrangement and the operator must, to a large extent, rely on experience and skill in providing for proper engagement and pressure application of the knife with the seal. The experience and skill required is rather extensive and operator training extends over a substantial period of time during which a rather substantial amount of production waste can be expected.

A substantial number of oil seal designs involve different molded rubber shapes which require variations in trimming operation. Depending upon the particular design in production, the area of the molded rubber part requiring trimming may vary considerably. Thus existing forms of trimming lathes are either limited for use with specific seal designs or must undergo a substantial variation or change in operational set-up to accommodate a different type of seal. Such a change often requires re-education of the operator as the trimming operation on different areas of seals can vary considerably particularly with regard to the amount of pressure used in advancing the knife into the molded rubber part.

With many types of oil seals it is necessary to trim the rubber molded parts in two or more separate areas thus requiring advancement of a trimming knife at different angles toward the rotating seal. Attempts to simultaneously perform multiple trimming operations result in substantial complexities in hand operated knife linkage arrangements even disregarding the fact that the individual trimming operations may require different pressure applications for efficient results. Complexities of this nature often lead to the necessity of performing separate individual trimming operations thus requiring the time consuming and expensive handling of a single seal on at least two separate trimming devices.

It is an object of the present invention to provide a new and improved workpiece trimming device and assembly permitting automatically controlled trimming of a workpiece even to the extent of simultaneous trimming of a plurality of separate areas thereof in a new and improved manner.

Another object is to provide a new and improved workpiece trimming assembly including as a part thereof cooperatively movable workpiece holder and trimming devices which by reason of their structure and operative arrangement permit efficiently controlled multiple workpiece area trimming.

A more specific object is to provide a new and improved trimming device and assembly including as a part thereof a simultaneously rotatable and reciprocable workpiece holder cooperating with at least one reciprocal trimming device which converges with the holder by mutual reciprocation thereof along independent axes of operation which are readily adjustable to permit a wide variety of trimming operations using a single device or assembly subject to ready adjustment and capable of automatic trimming operations.

Other objects not specifically set forth will become apparent from the following detailed description of the invention made in conjunction with the accompanying drawings wherein:

FIG. 3 is a side elevation of one of the trimming devices of the assembly as viewed generally along line 3—3 in FIG. 1;

FIG. 4 is a fragmentary top plan view of the trimming device of FIG. 3;

FIG. 5 is an enlarged fragmentary section of the knife mounting assembly of the trimming device of FIG. 3 as viewed generally along line 5—5 therein;

FIG. 6 is an enlarged fragmentary section of the spindle end portion of the quill of the workpiece holder as viewed generally along line 6—6 in FIG. 2;

FIG. 7 is a fragmentary section of the spindle illustrating operative association of the knives of the trimming devices therewith; and FIG. 8 is an exploded fragmentary section of the spindle illustrating separation of an oil seal and trim therefrom following completion of the trimming operation.

Figure 1:
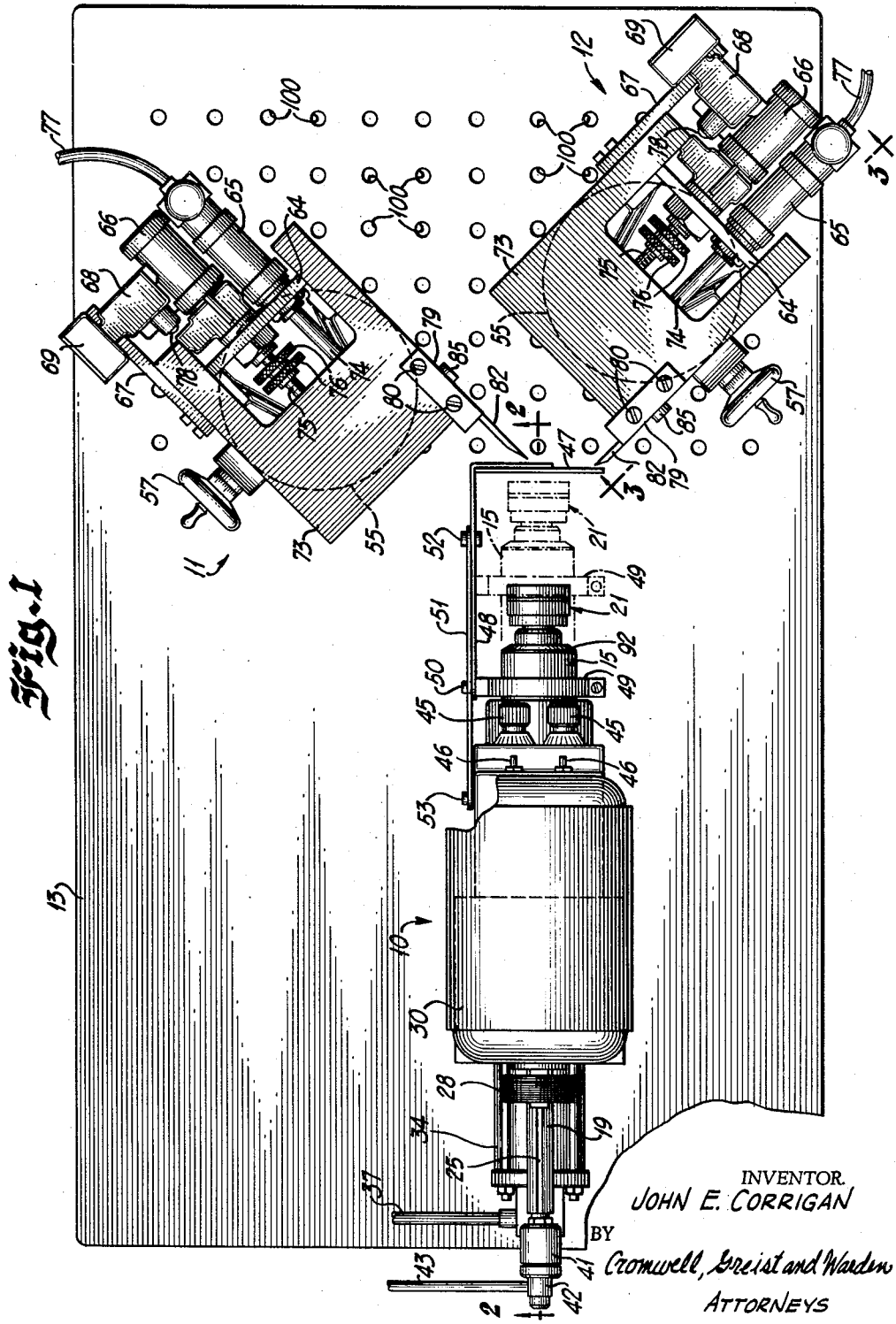
FIG. 1 is a plan view of the trimming assembly of the invention.
Figure 2:
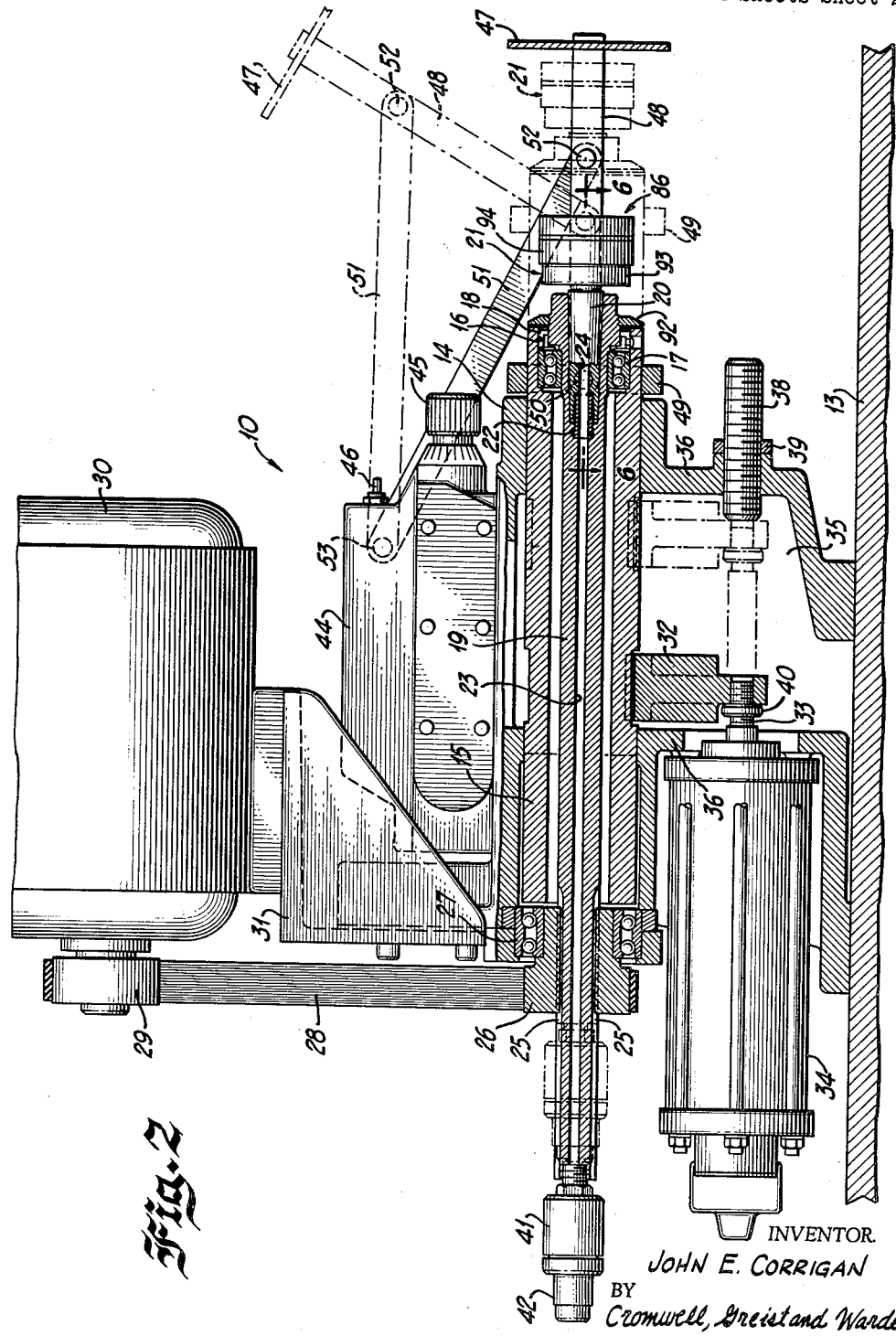
FIG. 2 is a longitudinal section of the workpiece holder of the assembly of FIG. 1 as viewed generally along line 2—2 therein.

FIG. 1 illustrates the workpiece trimming assembly of the invention as including a workpiece holder device 10 and a pair of angularly arranged trimming devices 11 and 12 all operatively mounted on a support plate 13. Referring particularly to FIGS. 1 and 2, the workpiece holder device 10 includes a generally tubular housing 14 mounting therein and through the front end thereof a tubular quill 15 which is slidable in the housing for reciprocation through the front end thereof. The quill 15 is formed at the outer end thereof with an internally enlarged bore 16 (best shown in FIG. 6) which receives therein a suitable roller bearing assembly 17 and a bearing sleeve or seal 18. A rotatable shaft 19 extends through the quill 15 and projects from the outer end thereof. The outer end of the shaft 19 is suitably designed for engagement with the roller bearing assembly 17 and the sleeve bearing 18 to be journaled in the quill for rotation relative thereto. Referring particularly to FIG. 6, the outer end of the shaft 19 has received therein the projecting base portion 20 of a spindle 21, a threaded locking sleeve 22 suitably interconnecting the base portion 20 with the shaft 19. The shaft 19 and base portion 20 of the spindle 21 each include longitudinally aligned passages 23 and 24, respectively, providing for spindle evacuation and pressurization in a manner to be described.

The rear end of the shaft 19 extends outwardly beyond the rear end of the quill 15 and is formed with a plurality of longitudinally extending and circumferentially spaced splines 25 formed along the outer surface thereof and extending substantially outwardly of the housing 14. An internally splined pulley 26 is mounted about the shaft 19 with the internal splines thereof drivingly connected with the splines 25 of the shaft. The pulley 26 is journaled in the rear end of the housing 14 by a roller bearing assembly 27 and is rotated by a drive belt 28 engaged with a drive pulley 29 forming a part of a suitable power source such as an electric motor 30. The motor is suitably mounted on the housing 14 through a mounting bracket 31.

The arrangement described provides for rotation of the shaft 19 by reason of the spline connection of the pulley 26 therewith, rotation of the spindle 21 with the shaft 19, and simultaneous reciprocation of the quill 15 including the shaft 19 and spindle 21. Reciprocation of the quill 15 is brought about by attachment of a yoke 32 thereto, this yoke being attached to the exposed end of a piston rod 33 forming a part of a two-way air cylinder 34 suitably mounted on the support plate 13. A bottom portion of the housing 14 is provided with an open area 35 defined between vertical flange portions 36 thereof in which the yoke 32 is received. The quill 15 is exposed to the area 35 and the piston rod 33 also projects thereinto. FIG. 1 illustrates an air line 37 connected to the air cylinder 34 to provide air pressure thereto from a suitable source (not shown) for operation of the air cylinder and reciprocation of the quill 15. During reciprocation of the quill 15 the rearwardly projecting portion of the shaft 19 readily slides through the drive pulley 26 by reason of the longitudinal spline connection therewith while simultaneously being rotated by the drive pulley 26. The length of longitudinal travel of the quill 15 is controlled by a threaded stop member 38 received through one of the wall portions 36 and variably fixed by a locking nut 39. The stop member 38 projects into the area 35 for abutment with the yoke 32 as shown in broken lines in FIG. 2 to control the extent of outward movement of the quill 15 from the housing 14. The extent to which the quill 15 is retracted into the housing 14 is controlled by a stop nut 40 threadedly received on the projecting end of the piston rod 33 and in abutment with the yoke 32.

A known type of rotary union including a fixed part 41 and a rotating part 42 is attached to the projecting rear end of the shaft 19 in communication with the air moving passage 23 extending therethrough. As shown in FIG. 1, the rotary portion 42 of the union has connected thereto an air line 43 which extends to a suitable vacuumizing means and air supply means (not shown) of a known type capable of evacuation the spindle 21 and alternatively delivering pressurized air thereto during the operation of the trimming assembly in a manner to be described. The workpiece holder device 10 further includes a control unit 44 mounted on the housing 14 and including suitable adjustment means 45 forming a part of the operating system (not shown) to adjust the speed of reciprocation and/or rotation of the spindle 21. The control unit 44 also includes operating switches 46 which may be used by the operator for manual or automatic operation of the assembly. The electrical and mechanical components of the operational controls of the assembly do not form a part of this invention and may be of any suitable type capable of providing the specified nature of interaction of the various devices of the assembly.

The workpiece holder device 10 also includes an automatic guard assembly comprising a normally vertical plate-like member 47 carried at the outermost end of a link 48. The link 48 at its innermost end is pivotally connected to a ring member 49 mounted about the projecting end of the quill 15, the pivotal connection being defined by a suitable fastener 50. A normally downwardly inclined operating link 51 is pivotally connected at its outermost end to the link 48 by a suitable fastener 52 located inwardly of the guard plate 47. The innermost end of the operating link 51 is pivotally connected by a suitable fastener 53 to the control unit 44 at a point spaced above the housing 14. In the retracted position of the quill 15 as shown in FIGS. 1 and 2, the guard plate 47 is located outwardly beyond the spindle 21 directly in front of the same and intersecting the axis of reciprocation thereof. When the quill 15 is extended from the housing 14 as shown in broken lines in FIGS. 1 and 2, pivoting of the operating link 51 results in the lifting of the guard plate 47 and the link 48 carrying the same. This ultimately places the guard plate in a raised inoperative position as shown in broken lines in FIG. 2. Return of the quill 15 to its retracted position results in automatic lowering of the guard plate into its operative position.

The details of the trimming device 12 are shown in FIGS. 3-5, it being understood that the trimming device 11 is of the same design and operates in the same manner. The trimming device includes as the base thereof a known type of indexing table 54 including a cross slide top portion 55 having crossing slide grooves 56 therein. A suitable rotating mechanism 57 operates the top portion 55 of the table to rotate the same for circular indexing thereof. Adjustment means 58 provide for cross sliding indexing of the trimming device mounted within the slots 56 of the table portion 55. For this purpose guide members 59 are attached to a slide frame 60 mounted on the table top and are received in the cross slide slots 56 in engagement with the cross slide mechanism controlled by the adjustment means 58. The table 54 is suitably mounted on the support plate 13.

The slide frame 60 includes four corner located journal blocks 61 interconnected by a central web 62 including a center cross plate 63. The innermost journal blocks 61 are interconnected by a transverse plate 64 to which a rearwardly projecting air cylinder 65 is mounted. A speed control valve unit 66 is also mounted on the plate 64 and a bracket 67 extends therefrom and supports a switch unit 68 and a junction box 69. The journal blocks 61 slidably receive therethrough a pair of guide rods 70 which at their outermost ends are interconnected by an end plate 71 located outwardly of the outermost journal blocks 61. The innermost ends of the guide rods 70 extend through suitable apertures in the transverse plate 64 and project inwardly therefrom. These ends of the guide rods have received thereon top plate support blocks 72 which cooperate with the end plate 71 in supporting a flat top plate 73 fixed thereto. This top plate including the end plate 71, support blocks 72 and rods 70 is reciprocable relative to the remaining elements of the trimming device 12.

Reciprocation of the top plate 73 is controlled by a piston rod 74 of the air cylinder 65 which extends through the transverse plate 64 and through a suitable aperture in the central web plate 63 into attachment with the end plate 71. A threaded rod 75 extends from the control valve unit 66 through the transverse plate 64 and a suitable aperture in the center web plate 63 into attachment with the end plate 71. The rod 75 carries thereon a pair of adjustable stop nuts 76 which may be threadedly advanced along the rod in opposite directions to control the extent of reciprocating movement of the top plate 73 in either direction. As shown in FIG. 1, the air cylinder 65 is connected through a suitable air supply tube 77 to an air source of known type providing for two-way operation of the air cylinder. The speed control valve unit 66 is of known type which provides for adjustable control of the speed of reciprocation of the top plate 73. The switch unit 68 includes a manually operated switch 78 available to the operator for manual operation of the trimming device to check adjustment thereof when setting up the assembly for operation with a given type of workpiece. The junction box 69 forms a part of the electrical system of the assembly including the switch 68 and is available to the operator for electrical system maintenance.

The top plate 73 along a front edge portion thereof carries a knife assembly. As shown in FIGS. 1, 3 and 5, the knife assembly includes a block member 79 attached by fasteners 80 to the top plate 73 and being formed with a longitudinal slot 81 along the outer side surface thereof. A known type of knife 82 is slidingly received in the slot 81 and projects substantially outwardly from the front face of the block 79 and is formed with a sharpened cutting edge 83. The knife 82 is formed with a longitudinal slot 84 therein through which a fastener 85 extends into threaded engagement with the block 79. The projecting length of the knife 82 may be varied by sliding adjustment thereof in the slot 81 with the fastener 85 used to lock the knife in its adjusted position.

As best shown in FIG. 1, the trimming devices 11 and 12 are mounted in angular positions relative to the axis of operation of the workpiece holder device 10. This provides the assembly with advantages gained from convergence of the various devices along different axes of reciprocating operation. With this arrangement the timing of engagement of the plurality of knives with the workpiece and the individual angle of engagement can be varied considerably to meet the trimming requirements for different workpiece designs.

FIG. 7 illustrates advantageous utilization of this arrangement and mode of operation in conjunction with one form of workpiece, namely an oil seal 86. The seal illustrated includes an annular stamping 87 to which has been molded an annular sealing lip portion 88 and an end face sealing portion 89. The sealing lip portion 88 is molded along the inner surface thereof with a spring retention groove 90 and when received from the mold, the seal is in the condition illustrated in FIG. 6. This condition includes the presence of an unwanted central membrane portion 91 which must be trimmed off to provide the sealing lip portion 88 with its final operative configuration.

The spindle 21 includes the base portion 20 previously described attached to the projecting end of the rotating shaft 19. The shaft carries an annular guard plate 92 which closes off the open end of the quill 15 and which is spaced from the quill to rotate relative thereto with the shaft 19. The base portion 20 of the spindle includes an enlarged disc-like head 93 which has attached thereto a seal mounting head 94 provided with an inner chamber 95 in communication with the passage 24. The end wall 96 of the head 94 includes along the outer surface thereof just inwardly of the outer periphery an annular projecting seal mounting rim 97 having an inwardly projecting rib 98. The seal 86 is mounted on the rim 97 with the rib 98 being received in the spring retention groove 90. The end wall 96 of the head 94 is formed with a plurality of apertures 99 providing for vacuum holding of the seal 86 on the outer end of the spindle.

The seal 86 in its freshly molded condition is manually mounted on the spindle 21 when the quill 15 is retracted in the housing 14 as shown in full lines in FIGS. 1 and 2. At this stage of operation of the assembly, the spindle 21 is evacuated through the hollow shaft 19 and the vacuum impressed in the spindle aids in holding the seal 86 in its trimming position. The assembly is then actuated by the operator to the extent that the quill 15 is moved outwardly of the housing 14 to its full extent of travel during which the guard plate 47 is raised out of operative position. Simultaneously, the trimming devices 11 and 12 are actuated with the top plates 73 thereof moving forwardly and carrying the knives 82 into converging engagement with the seal 86. FIG. 7 illustrates the knife 82 of the trimming device 11 being received within the interior of the seal 86 to remove the central diaphragm portion 91 therefrom to complete formation of the sealing lip portion 88. The knife 82 of the device 12 engages the end face sealing portion 89 of the seal 86 rearwardly of the stamping 87 to shape the same to permit ready friction mounting of the seal 86 in a shaft housing. The two separate and dissimilar trimming operations are carried out simultaneously and efficiently.

Upon completion of the trimming operations, the knives 82 are automatically retracted and then the quill 15 is automatically retracted with the guard plate 47 moving downwardly into operative position. As shown in FIG. 1, the guard plate extends between the knives 82 and the spindle 21. During retraction of the quill, the vacuum in the spindle is maintained with the result that the trim 91 is still held by the spindle. Upon complete retraction, the operating system of the assembly functions to release the vacuum in the spindle and force air therethrough as shown in FIG. 8 to eject both the trimmed seal 86 and the trim 91. The forceable ejection of the seal and the trim from the spindle can possibly result in at least the seal being blown against the guard plate 47. The positioning of the guard plate prevents the seal from being blown against the knives 82 and damaged thereby. Thus the finished seal and trim may hit the guard plate and be deflected thereby downwardly onto the support plate 13 for ready removal by the operator. The vacuum in the spindle functions to hold the trim 91 in place at all times during the trimming operation thus preventing a portion of the trim from buckling or bending and thus interfering with completion of the entire trimming operation.

By providing both the workpiece holder device 10 and trimming devices 11 and 12 with controlled reciprocating movement several advantages are realized. The length of operative travel of each of the devices can be maintained at a minimum thus realizing better trimming control within closer tolerances, concentricity, etc. Cooperating movement of the workpiece holder device eliminates the necessity of multi-directional movement of the knives thus lending simplicity to the trimming assembly and realizing better control of the trimming operation. In this respect it will be realized that movement of the spindle alone to obtain the trimming operation provided by the trimming device 12 as shown in FIG. 7 would not be possible. Movement of the knife of the trimming device 12 alone toward a rotating spindle in a fixed position would permit the particular outer periphery trimming operation illustrated but would require either a separate trimming operation or a very complex linkage arrangement providing for simultaneous use of the two knives 82. Furthermore, it will be appreciated that the trimming operation provided by the trimming device 11 requires a deeper cut than that provided by the trimming device 12 and manual linkage operation would require a difference in trimming pressure applied to the individual knives. With the assembly of the present invention, the individual trimming operations of the trimming devices may be readily regulated by the positive stop control means provided with each of the devices. Angular positioning of the trimming devices 11 and 12 may be readily variable by reason of their built-in adjustment features and by the provision of a plurality of holes 100 in the support plate 13 (FIG. 1) through which each device is suitably attached in operative position.

Reciprocating movement of both the workpiece holder and trimming knife is also desirable in connection with providing an adequate loading and unloading space for the operator. It is important to utilize sufficient knife movement to perform a skiving cut rather than utilize a stationary knife with all of the movement being present in the holder. The semi-automatic nature of the assembly eliminates special skill and experience on the part of the operator as the exercise of skill is necessary only in connection with adjusting the various devices of the assembly to perform the requisite trimming operations. Once suitable adjustments are made, the assembly is capable of automatic operation over an extended period of time with a speed of operation capable of materially increasing production and reducing waste.

Obviously certain modifications and variations of the invention as hereinbefore set forth may be made without departing from the spirit and scope thereof, and therefore only such limitations should be imposed as are indicated in the appended claims.

I claim:

1. A trimming device comprising a workpiece holder, means mounting said holder for reciprocation along a first axis, a pair of workpiece trimming means each including projecting knives, means mounting each of said knives for reciprocation along separate axes, said holder and trimming means being arranged relative to one another to provide for mutual converging operation therebetween with said knives contacting a workpiece on said holder during simultaneous outward movement of said knives and holder along their respective axes of reciprocation, each of said axes being angularly offset relative to the remaining axes, and operating means common to said holder and knives to provide said simultaneous outward movement.

2. The device of claim 1 wherein said holder includes vacuum means in communication with a workpiece carried thereby to retain the same and the trim thereof on said holder during reciprocation thereof along said first axis.

3. A trimming device comprising a workpiece holder, means mounting said holder for reciprocation along a first axis, a pair of workpiece trimming means each including projecting knives, means mounting each of said knives for reciprocation along separate axes, said holder and trimming means being arranged relative to one another to provide for converging operation therebetween with said knives contacting a workpiece on said holder during simultaneous outward movement of said knives and holder along their respective axes of reciprocation, each of said axes being angularly offset relative to the remaining axes, guard means intercepting said axis adjacent the area of operative convergence, and means pivotally connecting said guard means with said holder to move said guard means into an inoperative position upon outward movement of said holder.

4. The device of claim 3 wherein said holder includes vacuum means in communication with a workpiece carried thereby to retain the same and the trim thereof on said holder.

5. A workpiece trimming assembly comprising a workpiece holder device including a housing having mounted therein a reciprocable and rotatable quill mounting at the outermost end thereof a workpiece holding spindle, operating means connected to said quill for continuous rotation of said spindle and controlled reciprocating projection and retraction thereof relative to said housing along a first axis, an air evacuation passage in said quill and spindle in communication with surface portions of a centrally recessed workpiece carried by said spindle to hold the same and the trim thereof on said spindle during rotation and reciprocation thereof, a trimming device including reciprocating slide means carrying a projecting knife spaced from said holder device, and operating means for said trimming device to reciprocate said slide means along an axis which is convergent with said first axis to provide for operative engagement of the projecting knife thereof with the recessed central portion of said workpiece carried by said spindle and when said quill is fully projected from said housing.

6. The assembly of claim 5 wherein said operating means of said quill and trimming device include adjustable positive stop means providing for controlled reciprocating movement of said quill and the slide means of said trimming device and controlled engagement of said knife and workpiece.

7. A workpiece trimming assembly comprising a workpiece holder device including a housing having mounted therein a reciprocable and rotatable quill mounting at the outermost end thereof a workpiece holding spindle, operating means connected to said quill for continuous rotation of said spindle and controlled reciprocating projection and retraction thereof relative to said housing along a first axis, an air evacuation passage in said quill and spindle in communication with surface portions of a workpiece carried by said spindle to hold the same and the trim thereof on said spindle during rotation and reciprocation thereof, guard means in the form of a plate-like shield pivotally connected to said housing and to said quill and intercepting said first axis in an area adjacent the outermost projection of said spindle along said first axis, the pivotal connection of said guard means being operative to displace the same out of said first axis when said quill is fully projecting from said housing, a trimming device including reciprocating slide means carrying a projecting knife spaced from said holder device, and operating means for said trimming device to reciprocate said slide means along an axis which is convergent with said first axis to provide for operative engagement of the projecting knife thereof with a workpiece carried by said spindle and when said quill is fully projected from said housing.

8. A workpiece trimming assembly comprising a workpiece holder device including a housing having mounted therein a reciprocable and rotatable quill mounting at the outermost end thereof a workpiece holding spindle, operating means connected to said quill for continuous rotation of said spindle and controlled reciprocating projection and retraction thereof relative to said housing along a first axis, an air evacuation passage in said quill and spindle in communication with surface portions of a centrally recessed workpiece carried by said spindle to hold the same and the trim thereof on said spindle during rotation and reciprocation thereof, at least a pair of trimming devices including reciprocating slide means carrying projecting knives spaced from said holder device, and operating means for each of said trimming devices to reciprocate said slide means along an axis which is convergent with said first axis to provide for operative engagement of the projecting knife thereof with a workpiece carried by said spindle when said quill is fully projected from said housing, the axes of said trimming devices being arranged relative to one another and to said first axis to provide for convergence of said knives and spindle with at least one of said knives being operatively engaged with the recessed central portion of said workpiece for trimming thereof.

9. The assembly of claim 8 wherein said operating means for said quill and trimming devices include adjustable positive stop means providing for controlled reciprocating movement of said quill and the slide means of said trimming devices and controlled engagement of said knives and workpiece.

10. A workpiece trimming assembly comprising a workpiece holder device including a housing having mounted therein a reciprocable and rotatable quill mounting at the outermost end thereof a workpiece holding spindle, operating means connected to said quill for continuous rotation of said spindle and controlled reciprocating projection and retraction thereof relative to said housing along a first axis, an air evacuation passage in said quill and spindle in communication with surface portions of a centrally recessed workpiece carried by said spindle to hold the same and the trim thereof on said spindle during rotation and reciprocation thereof, guard means in the form of a plate-like shield pivotally connected to said housing and to said quill and intercepting said first axis in an area adjacent the outermost projection of said spindle along said first axis, the pivotal connection of said guard meanas being operative to displace the same out of said first axis when said quill is fully projected from said housing, at least a pair of trimming devices including reciprocating slide means carrying projecting knives spaced from said holder device, and operating means for each of said trimming devices to reciprocate said slide means along an axis which is related to said first axis to provide for operative engagement of the projecting knife thereof with a workpiece carried by said spindle and when said quill is fully projected from said housing, the axes of said trimming devices being related to one another and to said first axis to provide for convergence of said knives and spindle adjacent the area of interception of said first axis by said guard means with at least one of said knives being operatively engaged with the recessed central portion of said workpiece for trimming thereof.

11. The assembly of claim 10 wherein said operating means for said quill and trimming devices include adjustable positive stop means providing for controlled reciprocating movement of said quill and the slide means of said trimming devices and controlled engagement of said knives and workpiece.

References Cited in the file of this patent
UNITED STATES PATENTS

| | | |
|---|---|---|
| 351,747 | Dimon | Nov. 2, 1886 |
| 929,679 | Lorenz | Aug. 3, 1909 |
| 1,078,391 | Wallbillich | Nov. 11, 1913 |
| 1,174,349 | Reynolds | Mar. 7, 1916 |
| 1,744,313 | Kadow | Jan. 21, 1930 |
| 2,085,908 | Huck | July 6, 1932 |
| 2,326,106 | Van Ness | Aug. 3, 1943 |
| 2,457,310 | Judelsohn | Dec. 28, 1948 |